United States Patent [19]

Robb et al.

[11] Patent Number: 5,568,384
[45] Date of Patent: Oct. 22, 1996

[54] BIOMEDICAL IMAGING AND ANALYSIS

[75] Inventors: Richard A. Robb, Rochester; Hong-Jian Jiang, Everett, both of Minn.

[73] Assignee: Mayo Foundation for Medical Education and Research, Rochester, Minn.

[21] Appl. No.: 960,128

[22] Filed: Oct. 13, 1992

[51] Int. Cl.$^6$ .................................................. G06F 159/00
[52] U.S. Cl. ........................................ 364/419.13; 382/132
[58] Field of Search .......................... 364/413.13, 413.19; 382/49, 41, 44; 128/600; 395/124, 125

[56] References Cited

U.S. PATENT DOCUMENTS

| | | | |
|---|---|---|---|
| 4,719,585 | 1/1988 | Cline et al. | 364/518 |
| 4,977,505 | 12/1990 | Pelizzari et al. | |
| 5,081,993 | 1/1992 | Kitney et al. | 128/661.08 |

OTHER PUBLICATIONS

Evans A. C., Beil C., Marrett S., Thompson C. J., and Hakim A., "Anatomical–Functional Correlation Using an Adjustment MRI–based Region of Interest Atlas with Positron Emission Tomography," *Journal of Cerebral Blood Flow and Metabolism*, vol. 8, pp. 513–529, 1988.

Evans A. C., Neelin P., Marrett S., Meyer E., Dai W., and Collins L., "Combined Stereotactic Mapping of MRI and PET Studies of Cognitive Activation in Human Brain." *Annual International Conference of the IEEE Engineering in Medicine and Biology Society*, vol. 13, No. 1, 1991.

Hawkes D. J., Hill D. L. G., Lehmann E. D., Robinson G. P. Maisey M. N., and Colchester A. C. F., "Preliminary Work on the Interpretation of SPECT Images with the Aid of Registered MRI Images and an MR Derived Neuro–anatomical Atlas" In *3d Imaging in Medicine Algorithms, Systems, Applications*, ed. by K. H. Hoehne, H. Fuchs & S. M. Pizer, pp., 241–252, Springer–Verlag, Berlin 1990.

Pelizzari C. A., Chen G. T. Y., "Accurate Three–Dimensional Registration of CT, PET, and/or MR Images of the Brain," *J. of Comp. Assis. Tomog.*, vol. 13, pp. 20–26, Jan. 1989.

Jiang H., Holton K., and Robb R., "Image registration of multimodality 3–D medical images by Chamfer matching," *Proc. of the SPIE, vol. 1660, Biomedical image processing and three–dimensional Microscopy*, pp. 356–366, 1992.

*Primary Examiner*—Jack B. Harvey
*Assistant Examiner*—X. Chung-Trans
*Attorney, Agent, or Firm*—Merchant, Gould, Smith, Edell, Welter & Schmidt, P.A.

[57] ABSTRACT

A method for synthesizing three dimensional multimodality image sets into a single composite image with accurate registration and congruence. Surfaces are initially extracted from two or more different images to be matched using semi-automatic segmentation techniques. These surfaces are represented as contours with common features to be matched. A distance transformation is performed for one surface image, and a cost function for the matching process is developed using the distance image. The geometric transformation includes three-dimensional translation, rotation and scaling to accommodate images of different position, orientation and size. The matching process involves efficiently searching this multi-parameter space and adjusting a surface or surfaces to find the best fit among them which minimizes the cost function. The local minima problem is addressed by using a large number of starting points. A pyramid multi-resolution approach is employed to speed up both the distance transformation computation and the multi-parameter minimization processes. Robustness in noise handling is accomplished using multiple thresholds embedded in the multi-resolution search. The method can register both partially overlapped and fragmented surfaces.

3 Claims, 8 Drawing Sheets

BIOMEDICAL IMAGING AND ANALYSIS

FIELD OF THE INVENTION

The present invention generally relates to anatomical modeling of the human body with a computer, and more particularly to a method for the accurate registration and congruence of three dimensional multimodality image sets and synthesizing them into a single composite multivalued image with accurate registration and congruence.

BACKGROUND OF THE INVENTION

The full scientific, medical and educational value of multidimensional, multimodality imaging remains largely unexplored, and has been impeded primarily by inadequate capabilities for accurate and reproducible registration and segmentation of multiple 2-D or 3-D images. With regard to registration, 2-D tomographic images taken at different times cannot be guaranteed to represent the same spatial section of the patient, and the 2-D images themselves do not contain the information required to either measure or correct the misregistration. The use of 3-D images makes full six-degree-of-freedom registration possible not only for images taken at different times, but for images from different modalities.

A general approach to registration of multiple images has three steps: 1) defining corresponding features between the different image data sets, 2) finding the matching transformation, and 3) transforming one (or more) of the images to bring it (them) into spatial registration with another. External and internal anatomical landmarks have been used by several researchers as matching features within multimodal images (Evans). Accurately locating these landmarks across modalities is an inherently manual process, presenting significant difficulty even to highly trained experts. Fiducial markers introduced at scanning time have been used for multimodal image registration with some success, but this technique requires the use of an immobilizing frame which is not removed between scans, and is not applicable to serial studies. Complex moments calculated for each image data set can be used as matching features, but exactly corresponding subvolumes must be defined. Matching of surfaces extracted from common objects (Pelizzari) shows greater potential for automated registration of serial as well as multimodal images, but many proposed techniques can only accurately measure misregistration in a limited set of geometrically-tractable anatomical situations. Most suffer from the classical problems associated with a global minimum search and usually require manual intervention.

In searching for the matching transformation, rigid body motion is often assumed in order to simplify the process. A rigid body may be defined in classical mechanics as a system of mass points subject to the holonomic constraints that the distances between all pairs of points remain constant throughout the motion. It allows three translational and three rotational degrees of freedom and, knowing these parameters, any rigid body motion can be restored. In order to find the ideal transformation, the images must be normalized to the same size. If the voxel dimensions are not known, then this normalization factor must be determined as part of the transformation process. The application of the best transformation to one image will often involve interpolation of data values. Generally, trilinear interpolation will give a satisfactory result. Non-linear gray level interpolation may be desired if the original image has a large inter-slice distance.

The process of forming an image involves the mapping of an object, and/or some property of an object, into or onto what may be called "image space." This space is used to visualize the object and its properties, and may be used to quantitatively characterize its structure and/or its function. Imaging science may be defined as the study of these mappings and development of ways to better understand them, to improve them and to productively use them. An important challenge of imaging science is to use multi-spectral image measurements (i.e. multimodality images) to provide advanced capabilities for visualization and quantitative analysis of biomedical images in order to significantly improve faithful extraction of both the scientific and clinical information which they contain, and thereby increase their usefulness in basic science, medical diagnosis and clinical treatment.

The spatial registration of medical images obtained from several modalities, such as positron emission tomography (PET), single photon emission computed tomography (SPECT), nuclear magnetic resonance (MR) images, computer-assisted tomography (CT) and ultrasound (US), has become clinically important. The revolutionary capabilities provided by these 3-D and even 4-D medical imaging modalities now allow direct visualization and study of structure and function of internal organs in situ. However, the ability to extract objective and quantitatively accurate information from 3-D biomedical images has not kept pace with the ability to produce the images themselves. The challenge is to provide advanced interactive and quantitative methods to visualize, extract and measure the intrinsic and relevant information contained in the data produced by these imaging systems; that is, the true morphologic, pathologic, biologic, physiologic, and/or metabolic "meaning" of the numbers. Capabilities to accurately synthesize or "fuse" the complementary image data produced by these multiple modalities into composite image sets could greatly facilitate realization of this potential.

SUMMARY OF THE INVENTION

The present invention provides a method for synthesizing three dimensional multimodality image sets into a single composite image with accurate registration and congruence. Surfaces are initially extracted from two or more different images to be matched using semi-automatic segmentation techniques. These surfaces are represented as contours with common features to be matched. A distance transformation is performed for one surface image, and a cost function for the matching process is developed using the distance image. The geometric transformation includes three-dimensional translation, rotation and scaling to accommodate images of different position, orientation and size. The matching process involves efficiently searching this multi-parameter space and adjusting a surface or surfaces to find the best fit among them which minimizes the cost function. The local minima problem is addressed by using a large number of starting points. A pyramid multi-resolution approach is employed to speed up both the distance transformation computation and the multi-parameter minimization processes. Robustness in noise handling is accomplished using multiple thresholds embedded in the multi-resolution search. The method can register both partially overlapped and fragmented surfaces.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 7:
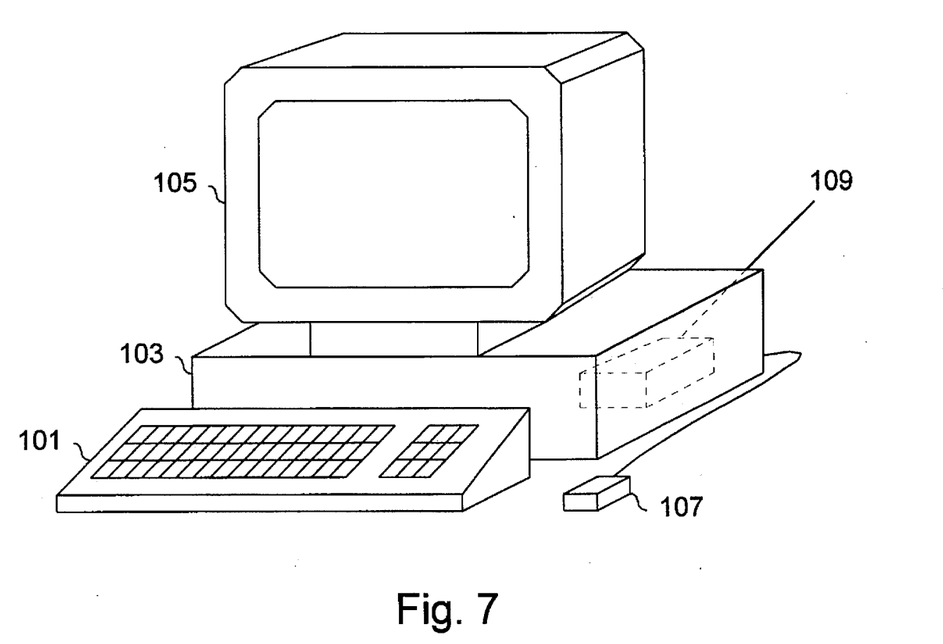
FIG. 7 is a perspective view of a workstation compatible with the present invention.

The method for synthesizing multimodality image sets into a single composite image is preferably designed around a computer workstation, as shown generically in FIG. 7. The workstation comprises a keyboard 101, a unit 103 containing a fast microprocessor and a large hard disk for storing image and modeling data, a high-resolution color display 105, a pointing device 107, and software 109. One skilled in the art will recognize that alternative commercial or specialized workstations may be used that provide equivalent system components.

$$d_{i,j,k} = \text{Min} \begin{bmatrix} d_{i+1,j-1,k-1}+5 & d_{i+1,j,k-1}+4 & d_{i+1,j+1,k-1}+5 & d_{i,j+1,k-1}+4 & d_{i,j,k+1}+3 \\ d_{i+1,j-1,k}+4 & d_{i+1,j,k}+3 & d_{i+1,j+1,k}+4 & d_{i,j+1,k}+3 & d_{i,j,k} \\ d_{i+1,j-1,k+1}+5 & d_{i,1,j,k+1}+4 & d_{i+1,j+1,k+1}+5 & d_{i,j+1,k+1}+4 & \end{bmatrix}$$

In the preferred embodiment of the present invention, two volume images to be registered are selected and named—one image as the "base image" and the other image as the "match image," which is subsequently transformed to align with the base image. The method may readily be extended to accommodate one or more match surfaces to be registered. Object contours are preferably extracted from both base and match images by using well-known image segmentation algorithms such as the ones available in the ANALYZE™ software system, designed and developed by the assignee of the present invention, Mayo Medical Ventures. The contours from the base images are stacked together to form three-dimensional base surfaces. At FIG. 8, 111, if the base image voxel is non-cubic in form (rough-edged or discontinuous), then shape-based surface interpolation is preferably applied to interpolate intermediate contours between every consecutive pair of actual contours at 113 in order to obtain a smoothly varying surface. A limited number of points are uniformly sampled from the match contour data set at 115, and only these points are used during image registration.

The preferred approach to 3-D image registration of the present invention is based on Chamfer matching. It combines a straightforward measure of registration cost applicable to arbitrarily complex multidimensional surfaces, using a multi-scale/multiple starting point search strategy, which greatly increases the probability of efficiently locating the global minimum without manual intervention.

Figure 8:
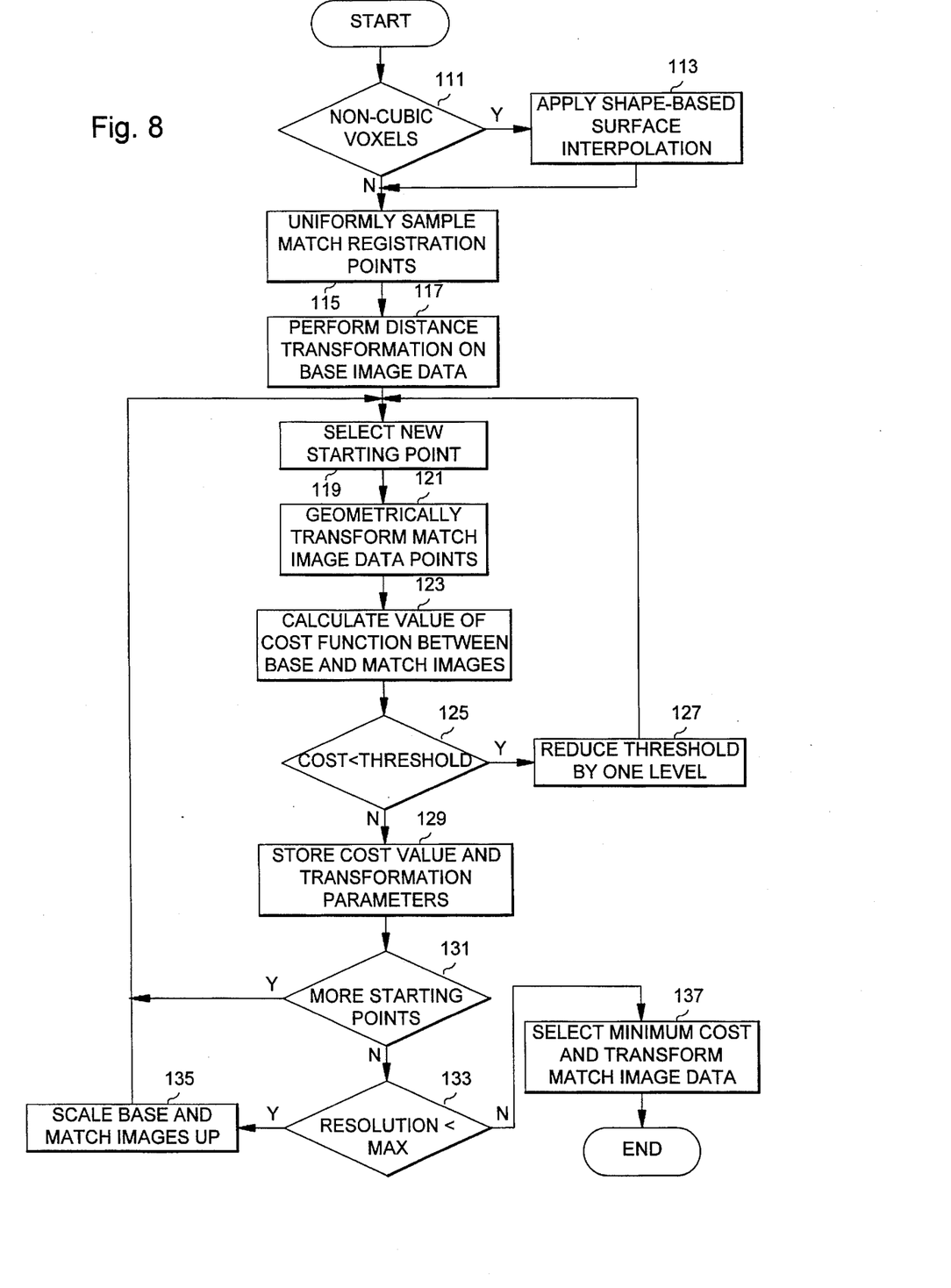
FIG. 8 is a flow diagram representing a method for synthesizing multimodality image sets into a single composite image compatible with the present invention.

Chamfer matching is accomplished by performing a distance transformation at 117 which converts a base surface image into a gray-level image in which all vexels have a value corresponding to the distance to the nearest surface vexel. Because the base surface is extracted from a digital image and represented by a discrete image form, calculation of exact Euclidean distances is not necessary. A good integer approximation of Euclidean distance can be computed using the Chamfer 3/4/5 algorithm. In the initial distance image, each surface vexel is set to zero and non-surface vexels are set to infinity. The distance image is modified with two sequential passes. The forward pass moves over the volume left to right, top to bottom, and front to back. The backward pass moves in exactly the opposite way.

Let $d_{i,j,k}$ denote the distance image value at (i,j,k). The forward pass modifies the distance image point $d_{i,j,k}$ as follows:

for i=1 to levels do
for j=1 to rows do
for k=1 to columns do

The backward pass modifies the distance image as follows:

for i=levels to 1 do
for j=rows to 1 do
for k=columns to 1 do $$d_{i,j,k} = \text{Min} \begin{bmatrix} d_{i+1,j-1,k-1}+5 & d_{i+1,j,k-1}+4 & d_{i+1,j+1,k-1}+5 & d_{i,j+1,k-1}+4 & d_{i,j,k+}+3 \\ d_{i+1,j-1,k}+4 & d_{i+1,j,k}+3 & d_{i+1,j+1,k}+4 & d_{i,j+1,k}+3 & d_{i,j,k} \\ d_{i+1,j-1,k+1}+5 & d_{i+1,j,k+1}+4 & d_{i+1,j+1,k+1}+5 & d_{i,j+1,k+1}+4 & \end{bmatrix}$$

This distance transformation is applied only to the base surface. Match surface points are geometrically transformed (e.g., translated and/or rotated) at 121 as the 6-dimensional parameter space is searched. At each point in parameter space, a cost function is derived at 123 from the root mean square (r.m.s.) average of the voxel values in the distance image which correspond to each of the transformed match points where d is a distance image value, $(i_m, j_m, k_m)$ are the coordinates of the $m^{th}$ sample point after geometric transformation, and n is the number of points sampled from the match surface. The r.m.s. average is divided by 3 to compensate for a unit distance 3 in the Chamfer-3/4/5 distance transformation.

$$\frac{1}{3} \left[ \frac{1}{n} \sum_{m=1}^{n} d^2_{i_m,j_m,k_m} \right]^{1/2}$$

Chamfer matching assumes that the best registration is achieved at the point where the cost function reaches the global minimum. This assumption is true only if:
1) there is only one global minimum point in the cost function,
2) the match surface is not severely distorted relative to the base surface, and
3) every sampled match surface point has a corresponding point existing on the base surface.

Assumption (1) is satisfied for most medical images which have no rotational symmetry, i.e., there exists only one true matching position. Assumption (2) must be satisfied in order for the assumption of rigid body motion to be true. If it is not satisfied, then a more complicated algorithm, such as elastic matching, may be used, although the rigid body transformation can be used as a first order approximation. Assumption (3) will be satisfied if the images are acquired so that the base volume contains the match volume, and if there is no noise or distortion to add an extra component to the match volume.

The match surface points may preferably be described as either real match points, which have corresponding points on the base surface, or as outliers, which have no such corresponding points. Outliers include noise, extra components, and distorted match points. The total cost when determining the goodness of fit is therefore the sum of costs caused by real match points and outliers. The contribution to the cost from real match points will yield the global minimum at the true registration point, but the cost contributed by outliers may result in a global minimum at a different point. In other words, the presence of outliers may cause a shift in the global registration point. Ideally, all outliers should be eliminated from the match surface to avoid this shift, but automatic recognition of these outliers is difficult and manual editing requires conceptualization of complex spatial transformations (except in the simplest of cases). Instead, a threshold may preferably be set for the maximum cost contribution from outliers so that the component cost for outliers is held constant near the true registration point. It is assumed that for correct registration the true match points are near the base surface, but most of the outliers are further away. Therefore, a threshold term (t) may be preferably introduced into the cost function as follows:

$$\frac{1}{3} \left[ \frac{1}{n} \sum_{m=1}^{n} \min(t^2, d^2_{i_m,j_m,k_m}) \right]^{1/2}$$

$t$ = threshold

Figure 1:
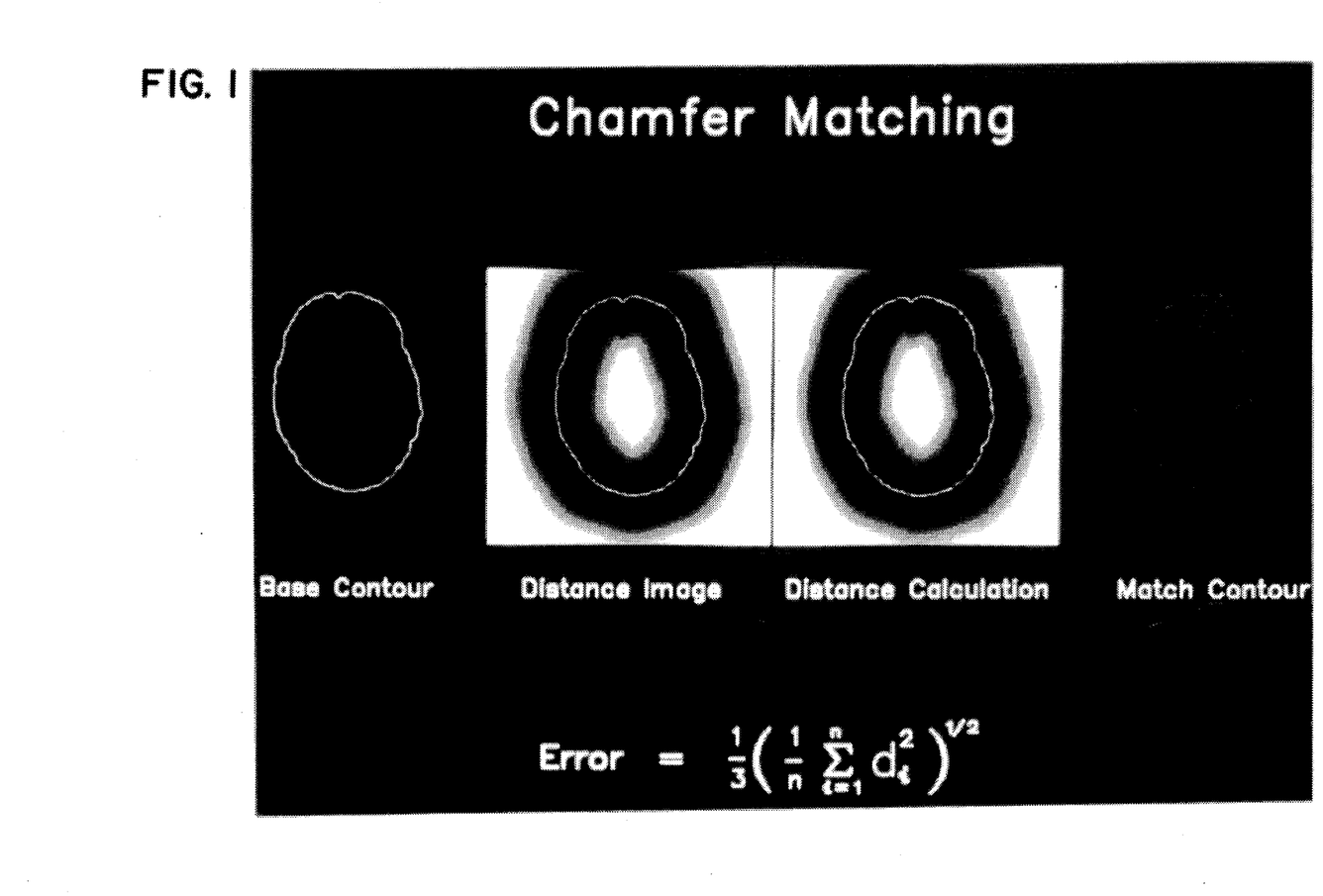
FIG. 1 is an example of Chamfer matching with 2-D images.

Match surface points having a distance value greater than the threshold are considered to be outliers and set to a constant value. The value is chosen such that it is large enough to tolerate small degrees of noise, distortion and transformation error associated with the true matching surface, but small enough to threshold outliers. A simple two-dimensional contour image may be used for illustration, as shown in FIG. 1. The base contour and the match contour are properly aligned except in the x direction. The distance image shows the transformation of the base contour.

Figure 2:
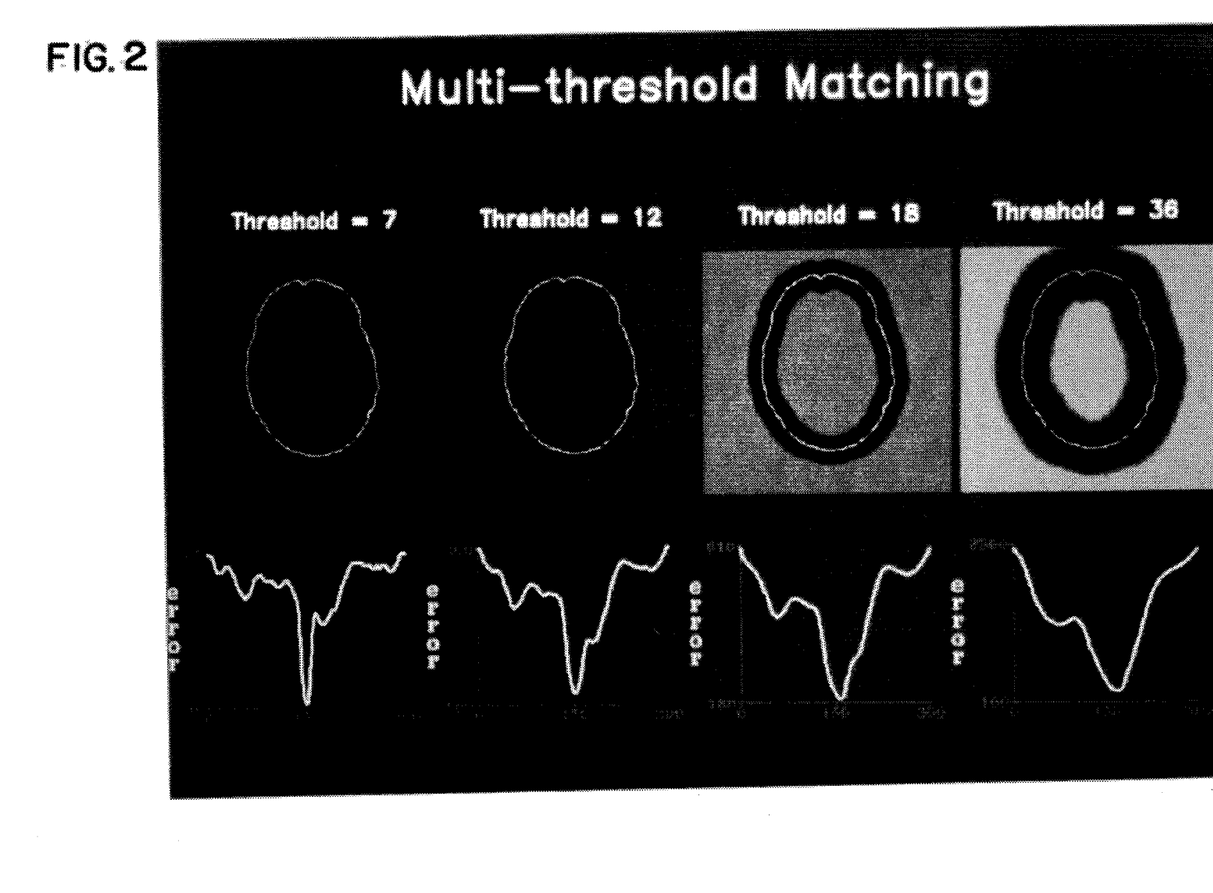
FIG. 2 is an example of multi-threshold matching with 2-D images.

The thresholding operation results in a sharper and narrower dip around the true registration point and introduces more local minima around the global minimum, making it harder to find. FIG. 2 shows that as the threshold increases, the shallow local minima around the global minimum tend to be smoothed out and the dip around the global minimum gets wider. As the procedure searches around the global minimum, the cost caused by outliers is held nearly constant and the cost of the real match surface points is minimized. As shown in FIG. 2, the global minimum is near the true registration point.

In order to improve the performance of the method, instead of applying one threshold directly, a multi-level threshold approach is used starting with a larger threshold and gradually reducing it at 125. The threshold for the highest resolution level ($t_0$) is empirically decided, and the thresholds for the lower levels are preferably determined at 127 by multiplying $t_0$ by the square root of the scale factor for that resolution level. Using a straight downhill search method, the minimization preferably begins at each level with the result from the previous level as an initial search point.

While a multi-threshold approach decreases the number of local minima to some extent, it does not entirely eliminate the problem, even when outliers do not exist. A systematic search of parameter space is guaranteed to find the global minimum, but is computationally prohibitive. Even less exhaustive search methods, such as simulated annealing, are not practical. Instead, the present invention provides for the preferable use of multiple starting points, selected at 119 and checked at 131, searching downhill towards a local minima for each point. The minimum among these minima is then considered to be global. The interval between starting points is preferably small enough to find the global minimum.

A multi-resolution approach may also be used to speed the registration process at 133. Matching preferably begins at the lowest resolution level and the result is used to guide higher level computation at 135. At the highest level, only fine adjustment is needed. Lower resolution surfaces can be generated by scaling the original surface as follows:

Let $s_{1,i,j,k}$ denote binary surface image point at level 1 and coordinate (i,j,k), and scale[1] denote scale at level 1=0 . . . n. Then, for lower resolution levels 1=1 to n, for all surface points $s_{0,i,j,k}=1$, set $$s_{1,i/scale[1],j/scale[1],k/scale[1]}=1$$

Figure 3:
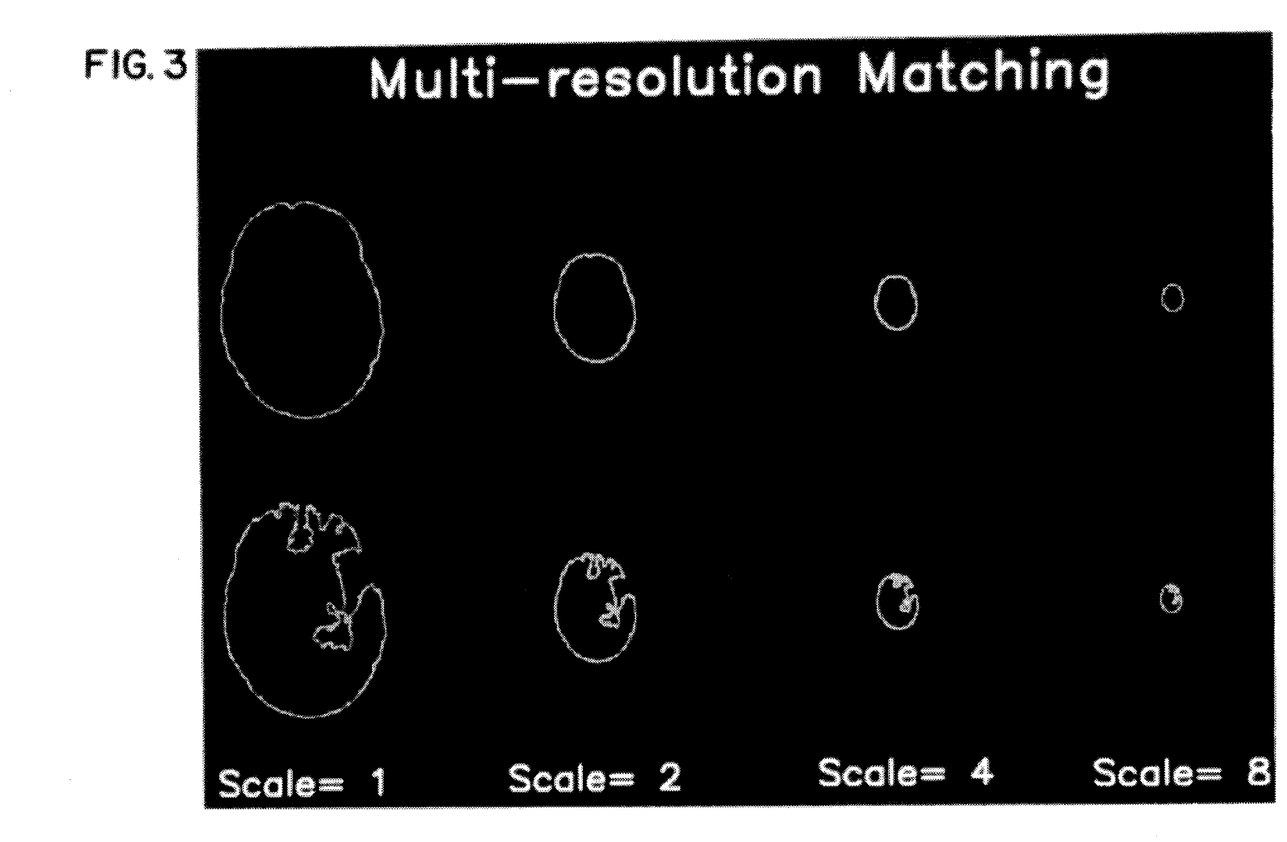
FIG. 3 is an example of multiresolution matching with 2-D images.

FIG. 3 contains examples of such scaling for both base and match contours.

The distance transformation with thresholding is preferably performed at each resolution level of the base surface image. The lower resolution images typically preserve rough shape information about the original surface so that the matching result at lower resolutions can guide the matching process at successively higher resolutions. For most medical images, the initial image can be reduced to as small as 20×20 pixel². At low resolution, the size of the image and therefore the size of the search space is reduced substantially, and fewer starting points are needed. At each level, all of the resulting local minima are preferably sorted, and the average cost of the smallest ten percent of the starting points is calculated. Starting points whose cost is smaller than twice the average cost value are used at the next resolution level. Therefore, most of the starting points are rejected at low resolution levels and only a small portion are used at the highest resolution levels. Finally, the local minima associated with each point in parameter space at the highest resolution are sorted to yield the global minimum used for the registration transformation at 137.

If a priori knowledge is known about image orientation and position, it can be effectively used by specifying a search range for the parameter space which will be centered on a "best initial guess" (e.g., the centroid or approximate orientation). The starting search points are uniformly distributed within this search range. The whole process can be preferably implemented iteratively by repeating the matching process with the previous result as the best initial guess at the next iteration. The search space is substantially reduced at the following iteration so that it may be implemented with a smaller grid interval for a finer search result. The iterative process may be terminated when the difference between transformations from two consecutive iterations is less than a prespecified threshold, usually determined empirically.

The combination of multi-threshold and multi-resolution approaches implemented with a multi-level distance transformation makes the preferred embodiment of the present invention efficient and robust. Computation time is decreased by approximating the distance value using the value of the corresponding voxel at a lower resolution distance image. This may be preferably implemented as follows:

Let $d_{1,i,j,k}$ denote the distance image point at level 1 and coordinate (i,j,k), and let scale[1] and t[1] denote scale and threshold at level $l=0 \ldots n$.

set l=n, (lowest resolution level)

do a two-pass distance calculation for voxel $d_{n,i,j,k}$ l=n−1 to 0 if $$d_{1+l,i/scale[1],j/scale[1],k/scale[1]} < t[n] \frac{scale[n]}{scale[n+1]}$$

do a two-pass distance calculation for voxel $d_{n,i,j,k}$ else $d_{n,i,j,k}=t[n]$ Since a threshold is already applied to the distance image, the cost function is now given by $$\frac{1}{3} \left[ \frac{1}{n} \sum_{m=1}^{n} d^2_{i_m,j_m,k_m} \right]^{1/2}$$

Results

The registration algorithm has been fully implemented in ANALYZE™. For illustration, the registration algorithm is applied to two types of data. The first type is simulated data for which match image surfaces are derived from base image surfaces according to user-defined transformation parameters, so that the accuracy of registration can be exactly measured. The second type is patient data, for which the exact transformation between the base and match images is not known, so that the accuracy of registration is confirmed visually with the assistance of linked cursors.

In the simulation studies, an original surface is extracted from MRI and CT images. Base surfaces are formed by using all or part of the original surfaces. A randomly chosen geometric transformation is applied to all or part of the original surfaces to form unregistered match surfaces. Three-dimensional random vector gaussian noise with zero mean and standard deviation up to 10% (of the surface dimension) is added to the match surfaces to simulate image noise and noise introduced by the segmentation process.

Suppose $M_1$ is a 4×4 homogeneous matrix which is the random transformation applied to the original surface to form the match surface, $M_2$ is a 4×4 homogeneous transformation matrix resulting from the registration process, and $M_{12}$ is the product of $M_1$ and $M_2$, i.e., $M_{12}=M_2 * M_1$, Let $\vec{p}_0=(x_0, y_0, z_0, 1)^t$ be a point from original image, and $\vec{p}_1=(x_1, y_1, z_1, 1)^t$ be $\vec{p}_1=M_2*M_1*\vec{p}_0=M_{12}*\vec{p}_0$.

Registration accuracy may be measured by comparing the matrix $M_{12}$ to the identity matrix. The more similar the matrices, the closer the match. A more obvious way of measuring registration accuracy is to calculate the Euclidean distance between points $\vec{p}_0$ and $\vec{p}_1$, i.e.:

$$d(\vec{p}_0,\vec{p}_1)=\|\vec{p}_0-\vec{p}_1\|=\sqrt{[(x_1-x_0)^2+(y_1-y_0)^2+(z_1-z_0)^2]}$$

The distance $d(\vec{p}_0, \vec{p}_1)$ is calculated for three sets of points: (a) ctr_err: centroid points of the match surface, (b) suf_err: the average distance of all the match surface points, (c) obj_err: the average distance derived from the same number of points as (b), but randomly distributed throughout the match object. In each study no a priori information about the transformation is assumed. A threshold of 0.5–1.0% (of the surface dimension) is used for the lowest matching level. The matching process is repeated an arbitrary number of times for statistical significance and the average distances and standard deviations are tabulated.

Simulation Example One

Figure 4:
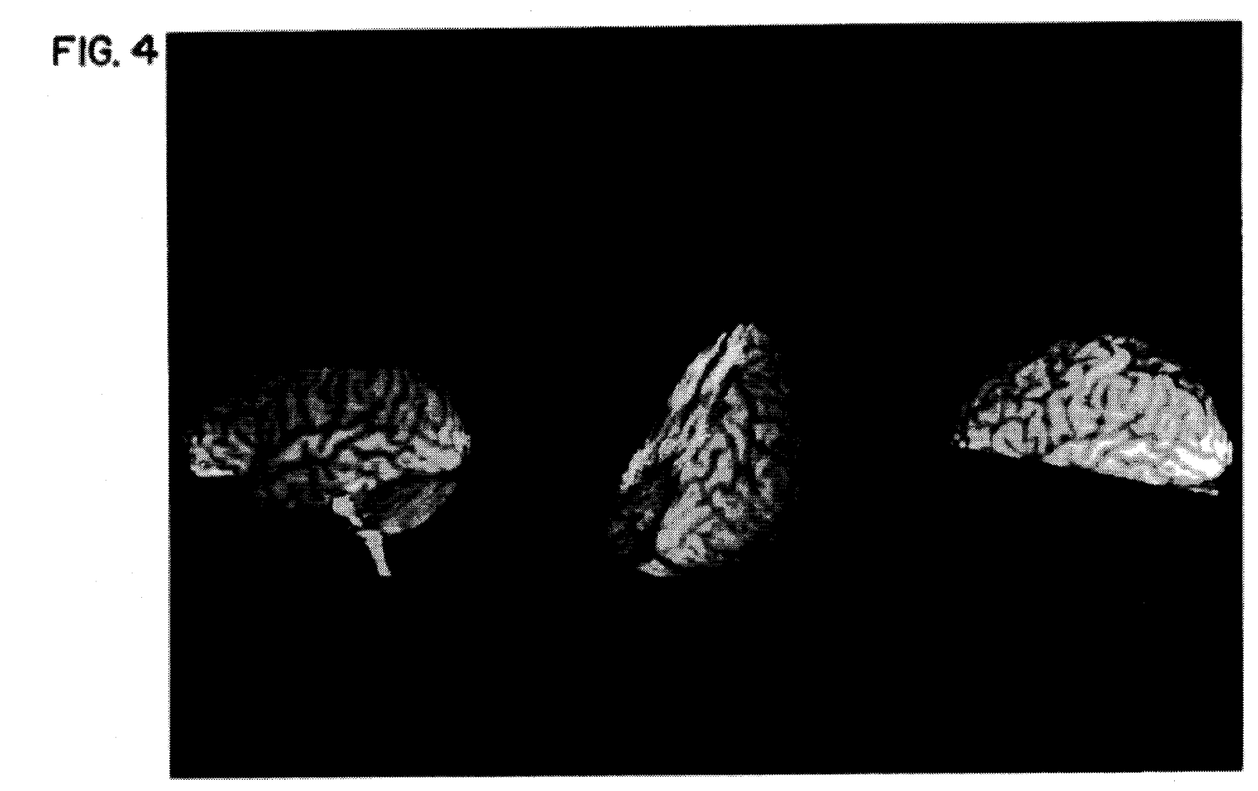
FIG. 4 is an example of 3-D image segmentation compatible with the present invention.
Figure 5:
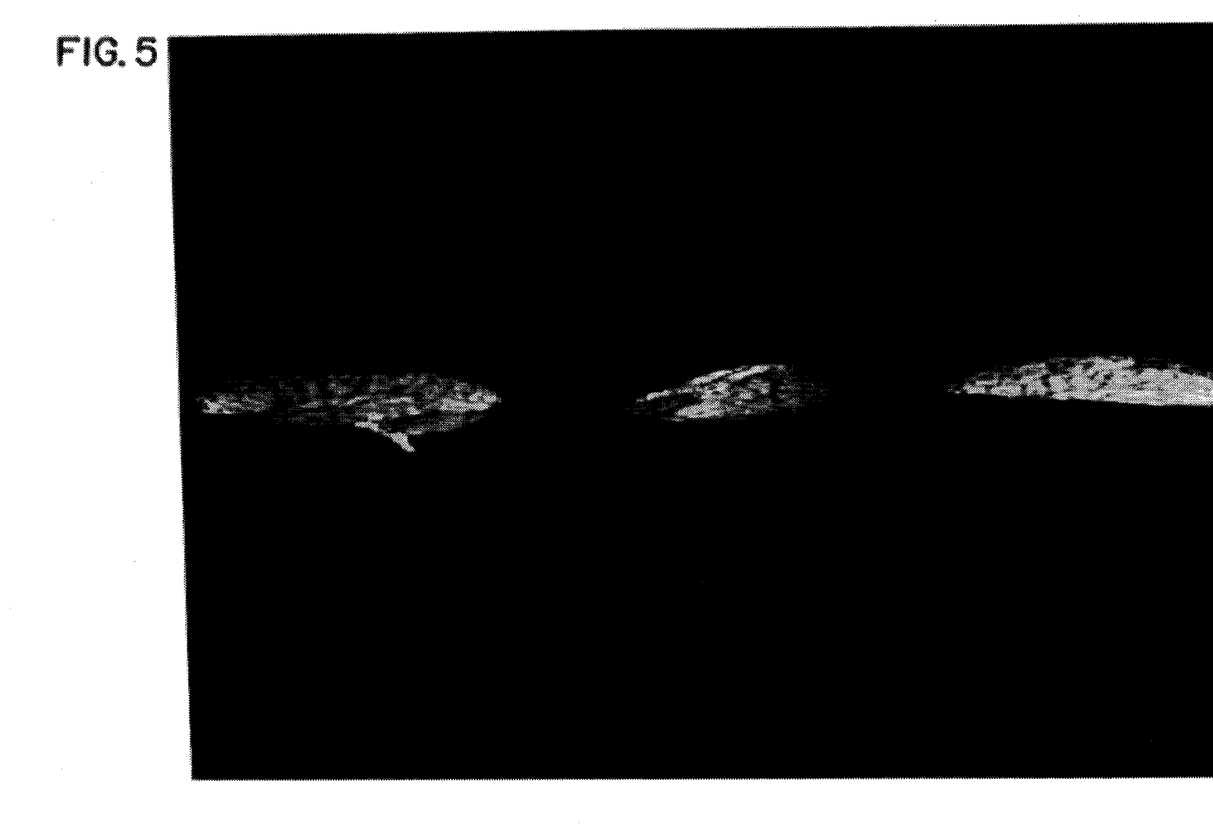
FIG. 5 is an example of 3-D image resampling compatible with the present invention.

A high resolution three-dimensional MR image of the head is used for brain surface segmentation. The image is of dimension 256×264×256 with voxel size 0.938×0.938×0.938 mm$^3$. The brain is segmented and displayed using the semi-automatic image segmentation and volume rendering tools in ANALYZE™. This segmentation is used as the original brain object/surface. Both the base and match object/surfaces are derived from this single original object/surface. Approximately 75–80% of the original surface is used as the base and match surfaces, with both surfaces containing 20–25% non-overlapping volumes. FIG. 4 shows the base and match objects before and after registration. To simulate non-cubic voxel data, the base surface is resampled at every third slice and the match surface is resampled at every fifth slice after arbitrary geometric transformation. These resampled versions are shown in FIG. 5. Gaussian noise with zero mean and standard deviation of 5% (7.0 pixels, 6.6 mm) of the surface size is added. The test results, summarized in Table 1a and 1b, are expressed in units of base image pixels.

TABLE 1a

| | Mean Value | | | |
|---|---|---|---|---|
| $M_{12}$ | 1.0000 | −0.0003 | −0.0011 | 0.1990 |
| | 0.0003 | 1.0000 | 0.0001 | −0.0914 |
| | 0.0011 | −0.0001 | 1.0000 | −0.2213 |
| | 0.0000 | 0.0000 | 0.0000 | 1.0000 |
| suf_err | 0.28 | | | |
| obj_err | 0.21 | | | |
| ctr_err | 0.17 | | | |

TABLE 1b

| | Standard Value | | | |
|---|---|---|---|---|
| $M_{12}$ | $\begin{bmatrix} 0.0000 & 0.0016 & 0.0048 & 0.5852 \\ 0.0016 & 0.0000 & 0.0024 & 0.3380 \\ 0.0048 & 0.0024 & 0.0000 & 0.6683 \\ 0.0000 & 0.0000 & 0.0000 & 0.0000 \end{bmatrix}$ | | | |
| suf_err | 0.16 | | | |
| obj_err | 0.10 | | | |
| ctr_err | 0.09 | | | |

The mean value matrix is the average of ten transformation matrices. The standard deviation of this average is small (approximately 0.005), indicating that the transformation matrices are highly similar to the identity matrix (the ideal case). The calculated error in this example suggests registration accuracy of subpixel resolution.

Simulation Example Two

Figure 6:
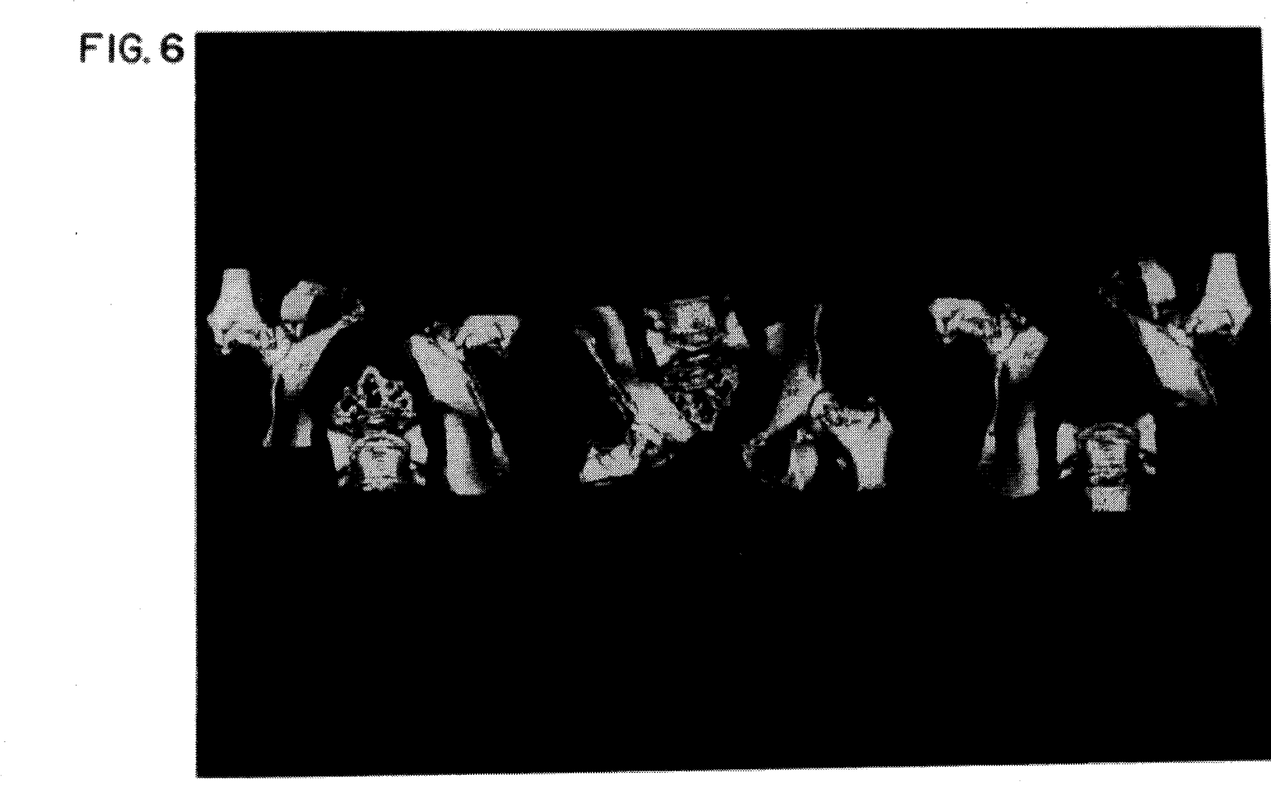
FIG. 6 shows base and match objects before and after registration in a manner compatible with the present invention.

A high resolution three-dimensional CT image of the pelvic girdle is used for hip bone segmentation. The CT image is of dimension 348×192×213 with voxel size 1.0× 1.0×1.0 mm$^3$. The hip bone surface is used as the original bone object/surface. Base and match objects are again both derived from this single original object. Approximately 70–80% of the original surface is used as the base and match surfaces, with both base and match surfaces containing 20–30% non-overlapping volumes. FIG. 6 shows the base and match objects before and after registration. To simulate non-cubic voxel data, the base surface is resampled at every fifth slice and the match surface is resampled at every seventh slice after arbitrary geometric transformation. Gaussian noise with zero mean and standard deviation of 10% (17.9 pixels, 17.9 mm) of the surface size is added. The test results are summarized in Table 2a and 2b.

TABLE 2a

| | Mean Value | | | |
|---|---|---|---|---|
| $M_{12}$ | $\begin{bmatrix} 1.0000 & -0.0003 & -0.0041 & 0.6540 \\ 0.0003 & 1.0000 & 0.0007 & -0.1850 \\ 0.0041 & -0.0007 & 1.0000 & -0.7079 \\ 0.0000 & 0.0000 & 0.0000 & 1.0000 \end{bmatrix}$ | | | |
| suf_err | 0.61 | | | |
| obj_err | 0.52 | | | |
| ctr_err | 0.47 | | | |

TABLE 2b

| | Standard Value | | | |
|---|---|---|---|---|
| $M_{12}$ | $\begin{bmatrix} 0.0000 & 0.0019 & 0.0016 & 0.4460 \\ 0.0019 & 0.0000 & 0.0037 & 0.4072 \\ 0.0016 & 0.0037 & 0.0000 & 0.5583 \\ 0.0000 & 0.0000 & 0.0000 & 0.0000 \end{bmatrix}$ | | | |
| suf_err | 0.12 | | | |
| obj_err | 0.13 | | | |
| ctr_err | 0.14 | | | |

The results in this example may be influenced by several factors, such as a coarser resampling grid, the fragmented nature of the surface, increased noise, and partial overlapping of surfaces. Even so, the calculated error once again indicates subpixel registration accuracy.

The Chamfer matching method has been employed and further developed for rapid and accurate registration of multimodality medical images. The method can register surfaces of any shape, surfaces with non-overlapping and/or multiple parts, and surfaces with great disparity in resolution and orientation. The computation time for the geometric transformation and minimization process is significantly reduced by using a multi-level strategy. The algorithm is robust in handling noise because of the combined multi-threshold and multi-resolution approach. The local minimum problem is addressed by using a large number of starting search points. The algorithm has achieved promising results in both contrived simulations and real data applications.

The present invention is to be limited only in accordance with the scope of the appended claims, since others skilled in the art may devise other embodiments still within the limits of the claims.

What is claimed is:

1. A method for synthesizing a base image data set and a match image data set into a single fused composite image data set with accurate registration and congruence using a programmable data processing system, comprising data input means, display means, and data storage means, the method comprising the steps of:

(a) using the data input means to provide the programmable data processing system with the base image data set and the match image data set, the base image data set and the match image data set each comprising a biomedical image generated by a biomedical image generation means;

(b) storing the base image data set and the match image data set in the data storage means; and (c) using the programmable data processing system to perform the steps of:

(1) if the voxels of the base image data set are non-cubic, applying shape-based surface interpolation to interpolate intermediate contours between every consecutive pair of actual contours of the base image data set to obtain a smoothly varying surface;

(2) uniformly sampling a plurality of registration points from the surface of the match image data set;

(3) creating a distance image data set by performing a distance transformation to convert the surface of the base image data set into a grey-level image in which all voxels have a value corresponding to the distance to the nearest surface voxel;

(4) transforming geometrically the registration points on the surface of the match image data set to become more closely aligned in orientation with corresponding points on the surface of the distance image data set;

(5) calculating the value of a cost function between registration points on the surface of the match image data set and the corresponding points on the surface of the distance image data set;

(6) if the value of the cost function is below a predetermined multi-level threshold value, reducing the threshold by at least one level and returning to step (4);

(7) storing the value of the cost function with the corresponding values for the geometric transformation parameters for later comparison;

(8) repeating steps (4) through (7) for each of a plurality of predetermined uniformly distributed starting points within the match image data set in order to generate a plurality of cost function values and corresponding geometric transformation parameters;

(9) if the resolution of the base image data set and the match image data set is below a predetermined multi-level maximum resolution level, scaling the base image data set and the match image data set upward at least one level and returning to step (4);

(10) selecting the minimum of the plurality of stored cost function values and using the corresponding stored geometric transformation parameters to map the match image data set onto the base image data set to create a single fused composite multi-valued image with two or more values associated with each 3-D spatial (x,y,z) coordinate uniquely representing and corresponding to the 3-D distribution of values of the base image data set and the match image data set; and (11) displaying, on the display means, the composite image values associated with each 3-D spatial (x,y,z) coordinate.

2. The synthesizing method of claim 1, wherein the cost function comprises a root mean square (r.m.s.) term substantially of the form $$\frac{1}{3} \left[ \frac{1}{n} \sum_{m=1}^{n} d^2_{i_m, j_m, k_m} \right]^{1/2}$$

where d is a distance image value, $(i_m, j_m, k_m)$ are the coordinates of the $m^{th}$ sample point after geometric transformation, and n is the number of points sampled from the match surface.

3. The synthesizing method of claim 2, wherein the cost function further comprises a noise threshold term substantially of the form $$\frac{1}{3} \left[ \frac{1}{n} \sum_{m=1}^{n} \min(t^2, d^2_{i_m, j_m, k_m}) \right]^{1/2}$$

where d is a distance image value, $(i_m, j_m, k_m)$ are the coordinates of the $m^{th}$ sample point after geometric transformation, n is the number of points sampled from the match surface, and t is the noise threshold term.

\* \* \* \* \*